A. J. DAVIS.
Potato-Harvester.
No. 161,011. Patented March 23, 1875.
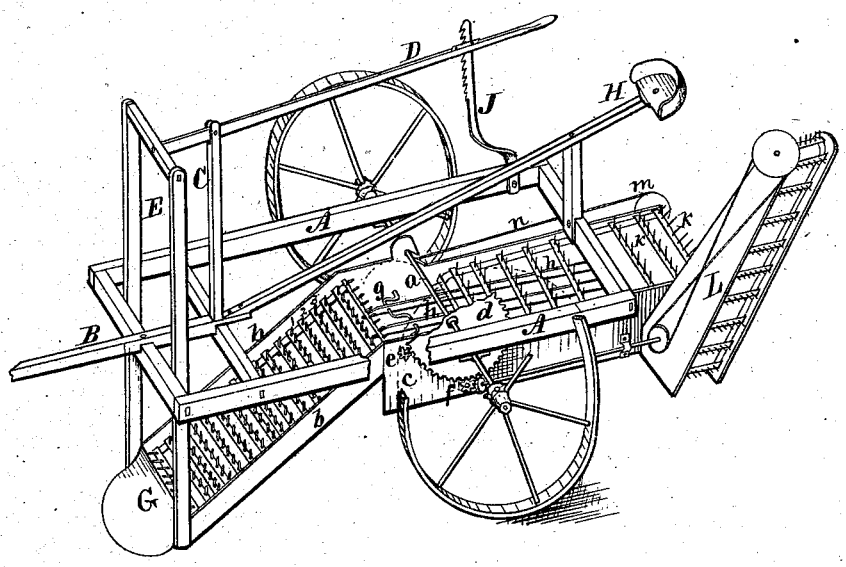

UNITED STATES PATENT OFFICE.

ALBERT J. DAVIS, OF PRAIRIE CITY, IOWA.

IMPROVEMENT IN POTATO-HARVESTERS.

Specification forming part of Letters Patent No. 161,011, dated March 23, 1875; application filed June 8, 1874.

*To all whom it may concern:*

Be it known that I, ALBERT J. DAVIS, of Prairie City, in the county of Jasper and State of Iowa, have invented a Potato-Harvester, of which the following is a specification:

The object of my invention is to construct a potato-harvester in such a manner that it will plow the ground, dispose of the vines and weeds, and clean and gather the potatoes. It consists in arranging, combining, and mounting upon a carriage an adjustable plow, a carrier and shaker, and a vine-carrier, as hereinafter fully set forth.

My drawing is a perspective view illustrating the construction and operation of my invention.

A A represent an oblong carriage-frame. B is the pole. C is an upright rigidly attached to a cross-piece spanning the front portion of the frame A, and forms a fulcrum for the lever D, pivoted in its top. E is a vertical frame that is raised and lowered by the lever D, connected at the top. G is a plow in the form of a scoop or scraper, rigidly connected with the lower end of the suspended frame E. a is a revolving carriage-axle that has its bearings in the rear portion of the carriage-frame A. One or both of the carriage-wheels may be rigid with the axle a, to form driving-wheels to operate the carriers and shaker. b b are the side pieces of a carrier-frame, connected with the plow G and frame E, and extending upward and rearward to the axle a. c c is a horizontal continuation of the same frame in rear of the axle a, to form a support for the shaker and the vine-carrier. This frame b c may be formed in any suitable way so that it can be suspended and pivoted to the axle a. d is a cog-wheel rigidly attached to the axle a. e is a pinion rigidly attached to the end of a carrier-shaft, which has its bearings in the upper end of the carrier-frame b. 1 2 3 represent a series of rakes on endless belts, to form a carrier that will convey the potatoes from the plow to the shaker. f is a pinion rigidly attached to the end of the crank-shaft g, which has its bearings in the frame c. h h represent a series of horizontal bars strung upon the series of cranks in the shaft g. They extend forward and under the carrier 1 2 3, and rearward and downward to rest upon a box-formed receptacle attached underneath the rear end of the frame c. k k represent a series of rakes on endless belts, mounted upon rollers that have their bearings in the frame c, and form a vine and weed carrier, that catches the vines from the shakers h, and conveys them rearward and drops them behind the advancing machine and out of the way. m is a belt-wheel on the rear shaft or roller of the vine-carriers k, and is connected and operated by the endless belt n, which runs over a belt-wheel attached to the crank-shaft g outside of the frame b c. H is a driver's seat, supported upon a suitable frame connected with the carriage-frame A. J is a rack attached to the rear end of carriage-frame A, to engage and lock the lever D, which raises and lowers the plow G. L is an elevator attached to the box under the rear end of the machine, and connected by suitable gearing with the cog-wheel d, so that the potatoes can be thereby elevated to a wagon-box.

In the practical operation of my machine the plow G lifts the soil, potatoes, and vines upon the carrier 1 2 3, and the driving-wheels, through the medium of the cog-wheel d and pinion e, operate the carrier, and as the potatoes and vines are carried rearward and upward the loose dirt falls through the carrier. The shakers h upon the crank-shaft g, operated by the pinion f and wheel d, catch the potatoes and vines, and shake and toss them rearward, and by so doing free the potatoes from adhering dirt, and deliver them into the box-receptacle at the rear end. The vine-carriers k, at the same time, operated by the belt n and its wheels, pick the vines from the shakers, separate them from the potatoes, and carry off and drop them over the rear of the machine.

I claim as my invention—

In a potato-harvester, the combination of the plow G, carrier 1 2 3, shaker h h, and vine-carrier k k, substantially as described, and for the purposes specified.

ALBERT J. DAVIS.

Witnesses:
D. M. BARTLETT,
S. F. MILLER.